United States Patent
Meir et al.

(10) Patent No.: US 9,547,574 B2
(45) Date of Patent: *Jan. 17, 2017

(54) POWER SHUTDOWN PREDICTION FOR NON-VOLATILE STORAGE DEVICES

(71) Applicant: Apple Inc., Cupertino, CA (US)

(72) Inventors: Avraham Poza Meir, Rishon Le-Zion (IL); Shai Ojalvo, Moshav Olesh (IL); Moshe Neerman, Hadera (IL)

(73) Assignee: Apple Inc., Cupertino, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 14/548,489

(22) Filed: Nov. 20, 2014

(65) Prior Publication Data

US 2015/0082099 A1 Mar. 19, 2015

Related U.S. Application Data

(63) Continuation of application No. 13/628,309, filed on Sep. 27, 2012, now Pat. No. 8,924,785.

(51) Int. Cl.
| | | |
|---|---|---|
| *G06F 11/00* | (2006.01) | |
| *G06F 11/30* | (2006.01) | |
| *G06F 1/26* | (2006.01) | |
| *G06F 1/30* | (2006.01) | |
| *G06F 11/14* | (2006.01) | |
| *G06F 9/44* | (2006.01) | |

(52) U.S. Cl.
CPC ............ *G06F 11/3058* (2013.01); *G06F 1/26* (2013.01); *G06F 1/30* (2013.01); *G06F 11/1441* (2013.01); *G06F 11/3034* (2013.01); *G06F 9/4401* (2013.01)

(58) Field of Classification Search
CPC ............ G06F 11/0751; G06F 11/1441; G06F 11/3034; G06F 11/3058; G06F 9/4401; G06F 9/442; G06F 1/24; G06F 1/26; G06F 1/30
See application file for complete search history.

(56) References Cited

U.S. PATENT DOCUMENTS

| | | | |
|---|---|---|---|
| 5,315,161 A * | 5/1994 | Robinson | G06F 1/30 307/66 |
| 5,784,628 A | 7/1998 | Reneris | |
| 5,862,394 A * | 1/1999 | Watts | G06F 1/30 713/330 |
| 5,907,675 A | 5/1999 | Aahlad | |
| 5,918,059 A * | 6/1999 | Tavallaei | G06F 1/26 713/300 |
| 5,923,099 A * | 7/1999 | Bilir | G06F 1/30 307/64 |

(Continued)

OTHER PUBLICATIONS

Office Action and Search Report from ROC (Taiwan) Patent Application No. 102135186, mailed Apr. 17, 2015.

(Continued)

*Primary Examiner* — Marc Duncan
(74) *Attorney, Agent, or Firm* — Meyertons, Hood, Kivlin, Kowert & Goetzel, P.C.

(57) ABSTRACT

A method includes, in a host that stores data in a storage device, detecting an event that is indicative, statistically and not deterministically, of an imminent power shutdown in the host. A notification is sent to the storage device responsively to the detected event, so as to cause the storage device to initiate preparatory action for the imminent power shutdown.

18 Claims, 1 Drawing Sheet

(56) References Cited

U.S. PATENT DOCUMENTS

| | | | |
|---|---|---|---|
| 6,412,074 B1 * | 6/2002 | Flannery | G06F 1/30 709/217 |
| 6,925,409 B2 * | 8/2005 | Smith | G06F 11/1441 702/132 |
| 7,000,146 B2 | 2/2006 | Mackey | |
| 7,107,472 B2 | 9/2006 | Weinold | |
| 7,716,461 B2 | 5/2010 | Downer | |
| RE41,547 E * | 8/2010 | Ha | G06F 1/30 713/300 |
| 7,890,778 B2 | 2/2011 | Jobs | |
| 8,612,779 B2 * | 12/2013 | More | G06F 1/3203 713/300 |
| 8,649,828 B1 | 2/2014 | Sanjeev | H04W 52/0254 455/574 |
| 8,924,785 B2 * | 12/2014 | Meir | G06F 11/1441 714/24 |
| 2002/0138772 A1 * | 9/2002 | Crawford | G06F 1/30 713/300 |
| 2002/0169991 A1 * | 11/2002 | Weinold | G06F 1/30 713/324 |
| 2005/0044453 A1 * | 2/2005 | Dunstan | G06F 1/30 714/43 |
| 2006/0184719 A1 * | 8/2006 | Sinclair | G06F 3/0607 711/103 |
| 2008/0168290 A1 * | 7/2008 | Jobs | G06F 1/26 713/324 |
| 2009/0117889 A1 * | 5/2009 | Varanda | G06F 9/4418 455/418 |
| 2009/0249087 A1 | 10/2009 | Wakrat | |
| 2010/0010684 A1 | 1/2010 | Lorenz | |
| 2010/0217920 A1 * | 8/2010 | Song | G06F 12/0246 711/103 |
| 2010/0262854 A1 * | 10/2010 | Bridgwater | G06F 1/3203 713/323 |
| 2010/0313050 A1 * | 12/2010 | Harrat | G06F 1/3203 713/323 |
| 2012/0084492 A1 * | 4/2012 | Stenfort | G06F 3/0605 711/103 |
| 2012/0151230 A1 * | 6/2012 | Utoh | G03G 15/5004 713/320 |
| 2014/0068310 A1 | 3/2014 | Sultenfuss | |
| 2016/0117232 A1 * | 4/2016 | Shimpuku | G06F 1/305 714/6.3 |

OTHER PUBLICATIONS

International Search Report and Written Opinion from PCT/US20131061912, mailed Dec. 20, 2013, Apple Inc., pp. 1-10.
"Contex-Aware Mechanisms for Reducing Interactive Delays of Energy Management in Disks", Igor Crk, Chris Gniady, Jun. 22, 2008, pp. 71-84.
Preliminary Report on Patentability in application No. PCT/US2013/061912 issued Apr. 9, 2015.
Igor Crk et al: "Context-Aware Mechanisms for Reducing Interactive Delays of Energy Management in Disks", , Jun. 22, 2008 (Jun. 22, 2008), pp. 71-84, XP055091725, Retrieved from the Internet: URL:http://www.usenix.org/eventiusenix08/tech/full_papers/crklcrk.pdf [retrieved on Dec. 5, 2013].

* cited by examiner

POWER SHUTDOWN PREDICTION FOR NON-VOLATILE STORAGE DEVICES

PRIORITY INFORMATION

This application is a continuation of U.S. patent application Ser. No. 13/628,309, filed Sep. 27, 2012, which is incorporated by reference herein in its entirety.

TECHNICAL FIELD

Embodiments described herein are related to the field of data storage, and particularly to methods and systems for predicting power shutdown in memory devices.

BACKGROUND

Various techniques are known in the art for signaling and managing power events in memory devices. For example, U.S. Pat. No. 7,000,146, whose disclosure is incorporated herein by reference, describes a memory system that provides one or more control signals for configuring and controlling a memory sub-system during a power failure or system reset. A power delay circuit and a power fail controller cooperate to quickly place the memory system in a retention state in the event a power failure event is detected. The power delay circuit detects either a reset signal or power failure to initiate the memory retention state. The power delay circuit and power fail controller ensure the memory system is initialized prior to entering the retention state.

U.S. Patent Application Publication 2009/0249087, whose disclosure is incorporated herein by reference, describes a power event indicator for managed memory device. A host device coupled to a managed memory device generates a signal indicative of an expected power event. The signal is received by the managed memory device, which performs one or more operations in response to the signal. In some implementations, a pin is added to a power management chip that provides a signal to interrupt the managed memory device when a power event is expected to occur. The signal provides the managed memory device time to finish one or more operations and to place the managed memory device in a known and/or safe state prior to the occurrence of the power event.

SUMMARY OF THE EMBODIMENTS

An embodiment described herein provides a method in a host that stores data in a storage device. The method includes detecting an event that is indicative, statistically and not deterministically, of an imminent power shutdown in the host. A notification is sent to the storage device responsively to the detected event, so as to cause the storage device to initiate preparatory action for the imminent power shutdown.

In some embodiments, detecting the event includes identifying a user action performed by a user of the host. In an embodiment, identifying the user action includes identifying that the user points to a shutdown command in a Graphical User Interface (GUI) but has not yet selected the shutdown command. Identifying the user action may include identifying a four-finger salute performed by the user in a touch-sensitive input device. In an embodiment, the host initiates the power shutdown when a shutdown button is pressed for a predefined duration, and identifying the user action includes indicating the imminent shutdown after less than the predefined duration.

In another embodiment, detecting the event includes identifying a failure event in the host that is statistically indicative of the imminent shutdown. Identifying the failure may include identifying a battery failure, a thermal event, a hardware failure, a firmware failure and/or a software failure in the host. In a disclosed embodiment, detecting the event includes identifying an inactivity period of the host that is longer than a predefined duration.

In some embodiments, the method includes receiving the notification in the storage device and initiating the preparatory actions responsively to the notification. The method may include receiving in the storage device at least one other indication of the imminent power shutdown, and verifying the imminent power shutdown based on both the notification and the indication. In an embodiment, the method includes aborting the preparatory action upon determining that the detected event is no longer valid.

There is additionally provided, in accordance with another embodiment, an apparatus including a storage device and a processor. The processor is configured to store data in the storage device, to detect an event that is indicative, statistically and not deterministically, of an imminent power shutdown in the apparatus, and to send a notification to the storage device responsively to the detected event, so as to cause the storage device to initiate preparatory action for the imminent power shutdown.

The embodiments disclosed herein will be more fully understood from the following detailed description of the embodiments thereof, taken together with the drawings in which:

DETAILED DESCRIPTION OF EMBODIMENTS

Overview

In various data storage applications, a host stores data in a storage device that comprises non-volatile memory. For example, a personal computer may store data in a Solid State Drive (SSD), and an enterprise storage controller may store data in an array of SSDs. In some scenarios, power shutdown may occur in the host and thus in the storage device. It is highly desirable to provide the storage device with an early notification of imminent power shutdown, so as to allow the storage device to perform preparatory actions before electrical power is actually disrupted.

Embodiments that are described herein provide improved methods and systems for detecting and preparing for power shutdown. In some embodiments, the host detects an event that is statistically indicative of the shutdown, but not deterministically. The host sends a notification to the storage device upon detecting such an event, and the storage device initiates the preparatory action.

In a personal computer, for example, the host may detect that the computer user has placed the mouse cursor above the "shutdown" selection in a menu, but has not yet pressed the mouse button. As another example, the user may perform "hard shutdown" by pressing the computer's power button for several seconds. The host may indicate a possible imminent shutdown after a portion of this time, e.g., after half a second. A long period of user inactivity may also be used as a statistical indication of imminent shutdown.

Since the events described above are statistical in nature, some occurrences of these events will not be followed by a genuine power shutdown. Therefore, the storage device may abort the preparatory actions before completion, if the detected event is found to be no longer valid.

Various examples of events that can be used as statistical indications of imminent power shutdown are described herein. Several examples of notification mechanisms between the host and the storage device, and several examples of preparatory actions, are also described. In some embodiments, the disclosed event-based prediction is performed in addition to (and usually before) an explicit interface that notifies the storage device deterministically of an expected power shutdown.

The methods and systems described herein provide the storage device with an early notification of imminent power shutdown. The storage device is therefore given a long time period in which to prepare for the shutdown. When using the disclosed techniques, more complex preparatory actions can be performed, and/or the preparatory actions can be completed sooner. In either case, both storage performance and user experience can be improved.

System Description

Figure 1:
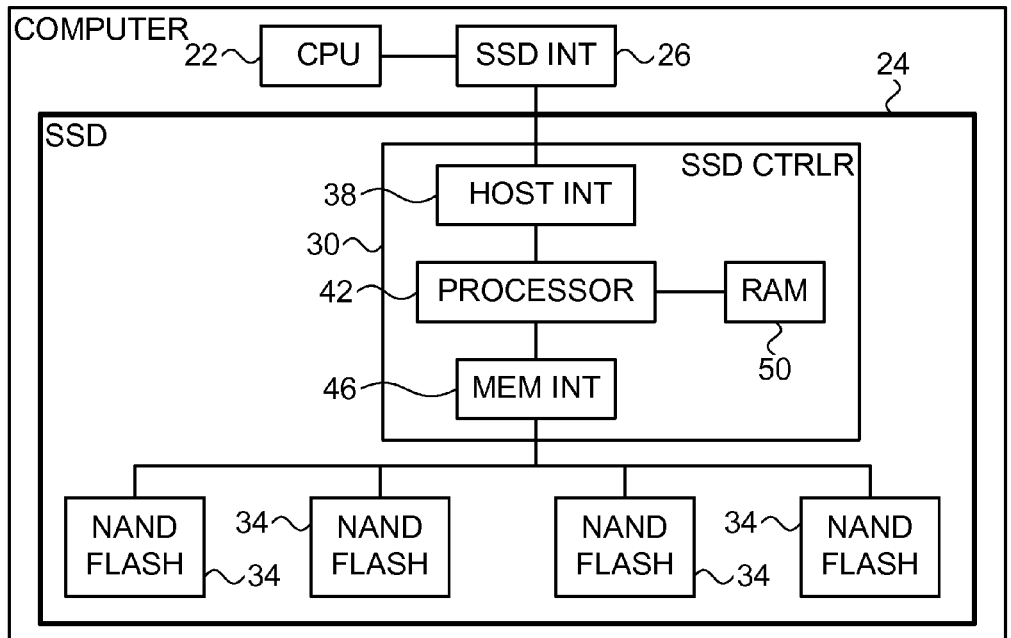
FIG. 1 is a block diagram that schematically illustrates a computer that stores data in a Solid state Drive (SSD), in accordance with an embodiment.

FIG. 1 is a block diagram that schematically illustrates a computer 20 that stores data in a Solid state Drive (SSD) 24, in accordance with an embodiment. Computer 20 may comprise, for example, a mobile, tablet or personal computer. The computer comprises a Central Processing Unit (CPU) 22 that serves as a host, and an SSD interface 26 for communicating between CPU 22 and SSD 24.

In alternative embodiments, the host may comprise any other suitable processor or controller, and the storage device may comprise any other suitable device. For example, the host may comprise a storage controller of an enterprise storage system, and the storage device may comprise an SSD or an array of SSDs. Other examples of hosts that store data in non-volatile storage devices comprise mobile phones, digital cameras, media players and removable memory cards or devices.

SSD 24 stores data for CPU 22 in a non-volatile memory, in the present example in one or more NAND Flash memory devices 34. In alternative embodiments, the non-volatile memory in SSD 24 may comprise any other suitable type of non-volatile memory, such as, for example, NOR Flash, Charge Trap Flash (CTF), Phase Change RAM (PRAM), Magnetoresistive RAM (MRAM) or Ferroelectric RAM (FeRAM).

An SSD controller 30 performs the various storage and management tasks of the SSD. The SSD controller is also referred to generally as a memory controller. SSD controller 30 comprises a host interface 38 for communicating with CPU 22 via interface 26, a memory interface 46 for communicating with Flash devices 34, and a processor 42 that carries out the various processing tasks of the SSD.

SSD 24 further comprises a volatile memory, in the present example a Random Access Memory (RAM) 50. In the embodiment of FIG. 1 RAM 50 is shown as part of SSD controller 30, although the RAM may alternatively be separate from the SSD controller.

SSD controller 30, and in particular processor 42, may be implemented in hardware. Alternatively, the SSD controller may comprise a microprocessor that runs suitable software, or a combination of hardware and software elements.

The configuration of FIG. 1 is an exemplary configuration, which is shown purely for the sake of conceptual clarity. Any other suitable SSD or other memory system configuration can also be used. Elements that are not necessary for understanding the principles of the disclosed embodiments, such as various interfaces, addressing circuits, timing and sequencing circuits and debugging circuits, have been omitted from the figure for clarity. In some applications, e.g., non-SSD applications, the functions of SSD controller 30 are carried out by a suitable memory controller.

In the exemplary system configuration shown in FIG. 1, memory devices 34 and SSD controller 30 are implemented as separate Integrated Circuits (ICs). In alternative embodiments, however, the memory devices and the SSD controller may be integrated on separate semiconductor dies in a single Multi-Chip Package (MCP) or System on Chip (SoC), and may be interconnected by an internal bus. Further alternatively, some or all of the SSD controller circuitry may reside on the same die on which one or more of memory devices 34 are disposed. Further alternatively, some or all of the functionality of SSD controller 30 can be implemented in software and carried out by CPU 22 or other processor in the computer. In some embodiments, CPU 22 and SSD controller 30 may be fabricated on the same die, or on separate dies in the same device package.

In some embodiments, SSD controller 30 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Early Statistical Prediction of Imminent Power Shutdown

In order to prepare for power shutdown in computer 20, SSD controller typically performs certain preparatory actions. For example, the SSD controller may commit any information that is stored in RAM 50 to Flash devices 34. Such information may comprise, for example, a logical-to-physical address translation table, a memory block database, or any other suitable type of information. Coherent tables and databases are important for preventing data loss and for reducing boot time when power is resumed.

As another example, the SSD controller may complete any unfinished storage operation in Flash devices 34. For example, when the SSD controller stores a Least Significant Bit (LSB) page and a Most Significant Bit (MSB) page in the same group of memory cells, the SSD controller may need to complete a currently-executed MSB write operation in order to prevent corruption of the LSB pages. If a backup of the LSB page exists, the MSB programming may typically be aborted before completion.

In some embodiments, the SSD controller commits the information to Flash devices 34 by programming only LSB pages (i.e., using Single Level Cell—SLC programming), a mode of programming that is considerably faster than MSB programming LSB-only programming is also considered safer in this situation: If power interruption occurs during LSB programming, only the currently-programmed LSB page will typically be corrupted. (If power interruption occurs during MSB programming, the LSB page that is stored in the same cell group is also likely to be corrupted.) Additionally or alternatively, SSD controller 30 may perform any other suitable preparatory actions.

In some embodiments, CPU 22 provides SSD 24 time for performing the preparatory actions by providing an early notification of the imminent power shutdown. The CPU provides the early notification by detecting events that are statistically indicative of the imminent shutdown. The term "statistically indicative" means that the events in question are often followed by power shutdown, but not deterministically. There is some non-zero probability that a particular occurrence of such an event will be a "false alarm," i.e., will not be followed by power shutdown. Events of this sort are referred to below as "prediction events" for the sake of brevity.

Some prediction events may comprise user actions that can be detected and are statistically indicative of imminent shutdown of the computer. For example, the CPU may detect that the user points to a shutdown command in a Graphical User Interface (GUI) of computer 20, but has not yet selected the shutdown command. This event can be detected earlier than the actual selection of the shutdown command, and thus allow more time for preparatory actions. On the other hand, there is some probability that the user will change his mind and not choose the shutdown option.

As another example, the CPU may detect that the user entered a "four-finger salute" (a gesture involving four fingers) in a touch-sensitive input device (e.g., a touch pad or a touch-sensitive display).

As yet another example, some computers initiate power shutdown when the user presses a shutdown button for a predefined duration (e.g., four seconds). In some embodiments, the CPU may declare a prediction event after the user presses the shutdown button for less than the predefined period (e.g., after half a second). This sort of event gives a prediction that precedes the actual shutdown by several seconds. In most cases the user will keep pressing the button for remainder of the predefined time period and shutdown will occur. There is some probability, however, that the user will change his mind and release the button.

In some embodiments, the prediction event comprises an internal failure in computer 20, which is likely to eventually lead to power shutdown. The internal failure may comprise, for example, a battery failure, a thermal event, a hardware failure, a firmware failure, a software failure or any other suitable failure. The CPU may regard such a failure as an early statistical indication of imminent power shutdown.

Yet another example of a prediction event is detection of a certain period of inactivity of the computer. Additionally or alternatively, CPU 22 may identify any other suitable kind of event that is statistically but not deterministically indicative of imminent power shutdown.

In some embodiments, the prediction event may comprise a combination of two or more different events. In some embodiments, CPU 22 and SSD 24 support a signal, command or other interface for indicating deterministic (i.e., non-statistical) shutdown to the SSD, whether immediate of imminent. In these embodiments, the CPU may apply the disclosed techniques in addition to this interface.

Computer 20 may comprise various kinds of interfaces for transferring the early power shutdown notification from the CPU to the SSD. In some embodiments, the CPU provides the notification over a sideband interface that is different from the interface used for exchanging storage commands and data with the SSD. The sideband interface may connect, for example, the computer's System Management Controller (SMC) to the SSD, or CPU 22 to the SSD. A sideband interface can typically be used even if the computer is stuck, hanging or in failure mode.

In alternative embodiments, the CPU transfers the notification to the SSD using a dedicated "prepare to shut down" command, over the same interface that is used for transferring storage commands and data. In yet another embodiment, the CPU and SSD are connected by a "keep alive" signal. This signal is set by the CPU and is normally active. Disruption of the signal for more than a predefined period is treated by the SSD as an indication of imminent power shutdown. The "keep alive" signal may comprise a dedicated signal to the SSD, or a trigger to a unit that is connected to the sideband interface. Further alternatively, the host may provide the notification to the SSD using any other suitable interface.

Figure 2:
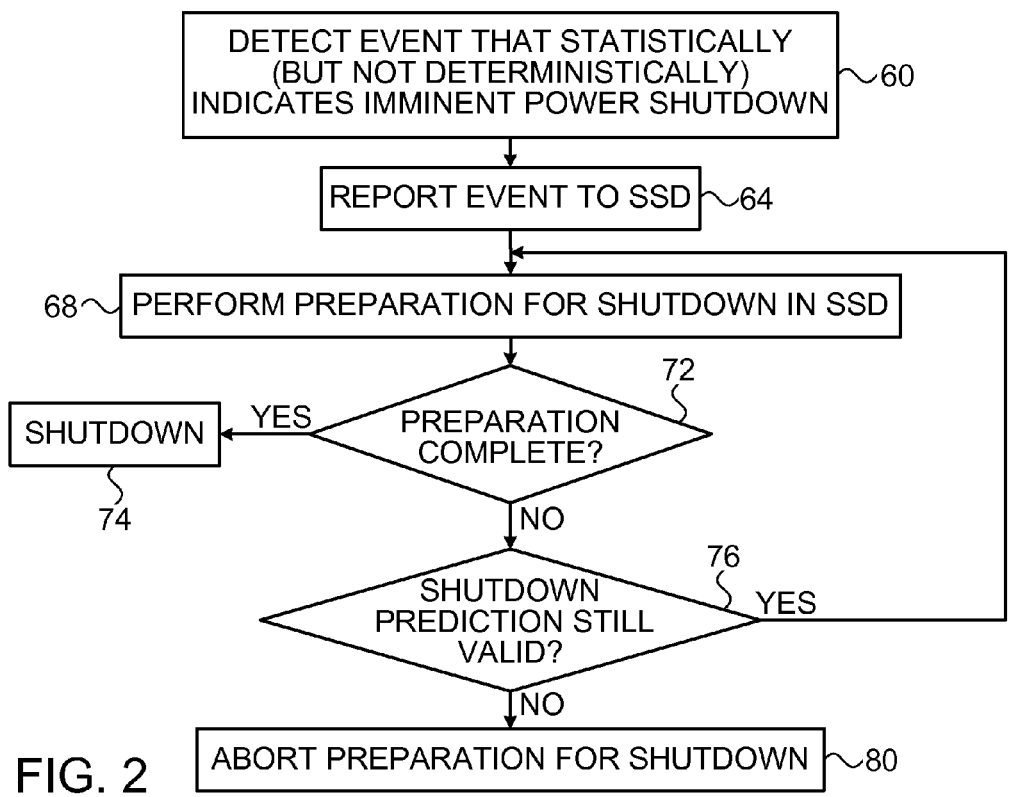
FIG. 2 is a flow chart that schematically illustrates a method for predicting and preparing for power shutdown in a computer, in accordance with an embodiment.

FIG. 2 is a flow chart that schematically illustrates a method for predicting and preparing for power shutdown in computer 20, in accordance with an embodiment. The method begins with CPU 22 of computer 20 detecting a prediction event, at a detection step 60. The prediction event, as explained above, is indicative statistically, and not deterministically, of an imminent power shutdown in the computer.

The CPU reports the detected event to SSD controller 30 of SSD 24, at a notification step 64. Upon receiving the notification, SSD controller 30 initiates preparatory action that prepare for the power shutdown, at a preparation step 68. The SSD controller checks whether the preparatory actions are completed, at a completion checking step 72. If completed, the SSD enters a shutdown state, at a shutdown step 74.

Otherwise, the SSD controller or the CPU checks whether the prediction event is still valid, at a validity checking step 76. As explained above, there is some probability that, during the preparatory actions, the prediction event will disappear and no shutdown will follow. In such a case, the SSD controller aborts the preparatory actions, at an aborting step 80. Otherwise, the method loops back to step 68 above.

Although the embodiments described herein mainly address SSDs, the methods and systems described herein can also be used in other applications, such as in any device or application that holds an unsaved cache, or any device or application that uses databases that may lose coherency in case of a sudden power failure. The disclosed techniques typically provide a considerable reduction in recovery time from power interruption, for example in comparison with journaling-based recovery solutions.

It will thus be appreciated that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An system, comprising:
a storage device including a group of memory cells; and a processor configured to:
  detect an event;
  predict a power shutdown in response to the detection of the event; and
  send a signal to the storage device in response to the prediction of the power shutdown;
wherein the storage device is configured to:
  perform one or more operations in preparation for the power shutdown in response to receiving the signal, wherein the one or more operations includes halting an in-progress program operation to a most significant bit page of the group of memory cells in response to a determination that a backup copy of data stored in a least significant bit page of the group of memory cells exists; and
  abort the one or more operations in response to a determination that the prediction of the power shutdown is not valid.

2. The system of claim 1, wherein to detect the event, the processor is further configured to identify an action performed by a user.

3. The system of claim 1, wherein to perform the one or more operations the storage device is further configured to transfer at least a portion of data from a volatile memory to a non-volatile memory included in the storage device.

4. The system of claim 1, wherein to detect the event, the processor is further configured to detect a thermal event.

5. The system of claim 1, wherein the storage device is further configured to enter a shutdown state in response to a determination that the one or more operations have completed.

6. The system of claim 1, wherein to detect the event, the processor is further configured to determine a period of inactivity that is greater than a predetermined duration value.

7. A method for operating a computing system, the method comprising:
  detecting an event;
  predicting a power shutdown of the computing system;
  sending a signal to a storage device in response to predicting the power shutdown;
  performing, by the storage device, one or more operations in response to receiving the signal perform one or more operations in preparation for the power shutdown in response to receiving the signal, wherein the one or more operations includes halting an in-progress program operation to a most significant bit page of a group of memory cells included in the storage device in response to determining that a backup copy of data stored in a least significant bit page of the group of memory cells exists; and
  aborting the one or more operations in response to determining that predicting the power shutdown is not valid.

8. The method of claim 7, wherein detecting the event comprises identifying an action performed by a user.

9. The method of claim 7, wherein performing the one or more operations comprises transferring at least a portion of data from a volatile memory to a non-volatile memory included in the storage device.

10. The method of claim 7, wherein detecting the event comprises detecting a thermal event.

11. The method of claim 7, wherein detecting the event comprises detecting a failure of hardware included in the computing system.

12. The method of claim 7, further comprising the storage device entering a shutdown state in response to determining the one or more operations have completed.

13. The method of claim 7, wherein detecting the event comprises determining a period of inactivity that is greater than a predetermined duration value.

14. The method of claim 7, wherein determining that predicting the power shutdown is not valid comprises determining the signal has been deasserted.

15. An apparatus, comprising:
  a volatile memory;
  one or more non-volatile memories;
  a memory interface coupled to the one or more non-volatile memories;
  a host interface configured to receive a signal from a host, wherein the signal is indicative of a prediction of a power shutdown;
  a processor configured to:
    perform one or more operations in preparation for the power shutdown in response to receiving the signal, wherein the one or more operations includes halting an in-progress program operation to a most significant bit page of a group of memory cells included in a particular non-volatile memory of the one or more non-volatile memories in response to a determination that a backup copy of data stored in a least significant bit page of the group of memory cells exists; and
    abort the one or more operations in response to a determination that the prediction of the power shutdown is not valid.

16. The apparatus of claim 15, wherein to perform the one or more operations the processor is further configured to transfer at least a portion of data from the volatile memory to the one or more non-volatile memories via the memory interface.

17. The apparatus of claim 15, wherein the one or more operations include a currently-executed write operation to the one or more non-volatile memories.

18. The apparatus of claim 15, wherein the processor is further configured to enter a shutdown state in response to determining the one or more operations have completed.

* * * * *